United States Patent [19]

Chanteau

[11] Patent Number: 5,386,226
[45] Date of Patent: Jan. 31, 1995

[54] CONNECTION UNIT FOR A TELEVISION SIGNAL DISTRIBUTION SYSTEM

[75] Inventor: Pierre Chanteau, La Haye Malherbe, France

[73] Assignee: U.S. Philips Corporation, New York, N.Y.

[21] Appl. No.: 107,493

[22] Filed: Aug. 17, 1993

[30] Foreign Application Priority Data

Aug. 19, 1992 [FR] France ................... 9210127

[51] Int. Cl.$^6$ ............................. H04N 7/10
[52] U.S. Cl. ............................. 348/10; 348/12; 455/3.2
[58] Field of Search ............ 358/86; 455/3.1, 3.2, 455/6.1, 6.2, 132, 188.1; H04N 7/10; 348/348, 6, 8, 10, 12, 13

[56] References Cited

U.S. PATENT DOCUMENTS

| | | | |
|---|---|---|---|
| 4,542,300 | 9/1985 | Nagatomi | 307/112 |
| 4,864,632 | 9/1989 | Moriyama | 455/3.1 |
| 5,058,198 | 10/1991 | Rocci | 358/86 |
| 5,073,930 | 12/1991 | Green | 358/86 |

FOREIGN PATENT DOCUMENTS 2143387  3/1973  Germany.

*Primary Examiner*—James J. Groody
*Assistant Examiner*—Sherrie Hsia
*Attorney, Agent, or Firm*—Robert J. Kraus

[57] ABSTRACT

For switching, for example four satellite signal sources, there is a switch for each user. This switch selects a source as a function of the value of a control signal applied to its RF signal output and connects the selected source to this output. It is provided with a connection unit (75) for each user who has the disposal of a television apparatus (74) and a satellite decoder (84). This connection unit comprises an adjustable control signal generator (78) which is connected to the input (81) of the satellite decoder (84) via a signal-blocking inductance and to a two-wire connection (83) for the control current produced by the decoder and determines the control signal to be applied as a function of the value of the parameters generated by the satellite decoder.

6 Claims, 1 Drawing Sheet

CONNECTION UNIT FOR A TELEVISION SIGNAL DISTRIBUTION SYSTEM

BACKGROUND OF THE INVENTION

The invention relates to a connection and control unit for use in a user installation, comprising a "satellite decoder" having an input for television signals from a satellite, which decoder is capable of applying a DC control voltage to this input for the purpose of controlling the selection, by means of an external apparatus, of one of two signals, and which has a control current output for controlling a magnetic polarizer, said user installation being also connected to a television signal distribution system comprising an assembly of more than two separate satellite television signal sources each furnishing a plurality of channels which differ from each other by their frequencies, at least one unit referred to as "switching unit" having at least one output which is connected to the user installation via a cable, a plurality of inputs each connected to one of said separate sources, and switching means for selecting one of its inputs and connecting it to its output, said selection being made as a function of the characteristics of a control signal applied through the cable connecting the user installation to the switching unit.

The invention also relates to a system as defined hereinbefore.

All known systems authorize the user to make a selection from several broadcasts by tuning to one or the other carrier frequency. On the basis of frequencies ranging between 950 and 1750 MHz, for example in the case of signals received from a satellite via a decoder which supplies a signal at a frequency in this range of frequencies, with bands having a width of approximately 30 MHz, it is possible to distinguish 24 different channels. Nevertheless, this number is insufficient, considering that, for example a satellite assembly such as "Astra" has already more than 24 channels. This is the reason why a distribution system has been conceived in which a user can select a signal from a cable among a plurality of cables.

Such a system is known from the document "Second IEEE National Conference on Telecommunications, 5 Apr. 1989, pp. 128, 132" by D. McGovern, and is entitled "Satellite television receivers for the domestic market". The system described in this document has a branching element with four inputs (a 4-way splitter switch) which selects one of the inputs as a function of a control signal whose nature is not specified.

SUMMARY OF THE INVENTION

It is an object of the invention to provide a connection and control unit and a system in which a user in possession of a satellite decoder can control the choice of a source among more than two sources, independently of other users, by only using the (remote) control means provided with the television apparatus and/or with the satellite decoder, without requiring a supplementary control element associated with the distribution system and without having to install a supplementary control connection between the user installation and the switching unit.

According to the invention, the connection and control unit is characterized in that it comprises:

a first connection for coupling said connection unit to the output of the switching unit, a second connection for coupling said connection unit to the television signal input of the satellite decoder, a third connection for coupling said connection unit to the control current output of the satellite decoder, connection means between the first and the second connection for transferring the satellite television signals from the first to the second connection, means for generating said control signal, with the characteristics of said control signal being determined as a function of at least the value of said control current applied to the third connection, means for applying said control signal to the first connection.

A further embodiment of the connection unit is characterized in that the means for generating said control signal comprises an adjustable control signal generator, which control signal is determined as a function of the value of said DC voltage applied by the satellite decoder to the second connection and of the value of said control current applied to the third connection and that the connector means block the transfer from the first connection to the second connection of the signal generated by said adjustable control signal generator.

In a further embodiment the adjustable control signal generator generates a DC voltage which may assume as many discrete values as there are different selections to be made by means of the switching unit.

In another embodiment the adjustable control signal generator generates a DC voltage which may assume a plurality of discrete values and on which an AC voltage is superimposed or not superimposed, each combination thus obtained corresponding to a different selection to be made by means of the switching unit.

It is also desirable that a large number of users can be served on the basis of a large number of signal sources with a reduced installation effort and economic use of material, all this with a minimal change of the customary professional installation techniques.

To this end a system for serving a plurality of user installations and comprising a distribution network for these user installations on the basis of the assembly of signal sources is characterized in that, with terrestrial television signals being also available, the distribution network comprises a number of cables which is equal to the number of separate satellite television signal sources, the terrestrial television signals being added to the satellite television signals on each cable.

Advantageously, such a system comprises branching elements arranged proximate to the user installations, each element being constituted by at least one shunting unit and at least one switching unit, the shunting unit being provided with means for connecting a plurality of cables of the distribution network and having at least a group of outputs whose number is equal to the number of distribution network cables connectable by said connection means, and with means for permanently taking off a part of the power of the signal on each cable and for applying it to a corresponding output of the group of outputs, the switching unit having as many inputs as the shunting unit allows connection of cables and each being connected to an output of the group of outputs of the shunting unit, and in which the switching unit itself has a plurality of outputs and is provided with a number of switching means which is equal to the number of its outputs, each switching means being assigned to one of the outputs for selecting one of the inputs and connecting it to said output, said selection being made as a function of said control signal applied to said output.

BRIEF DESCRIPTION OF THE DRAWINGS

These and other aspects of the invention will be apparent from and elucidated with reference to the embodiments described hereinafter. In the drawing

DETAILED DESCRIPTION OF PREFERRED EMBODIMENTS OF THE INVENTION

Figure 1:
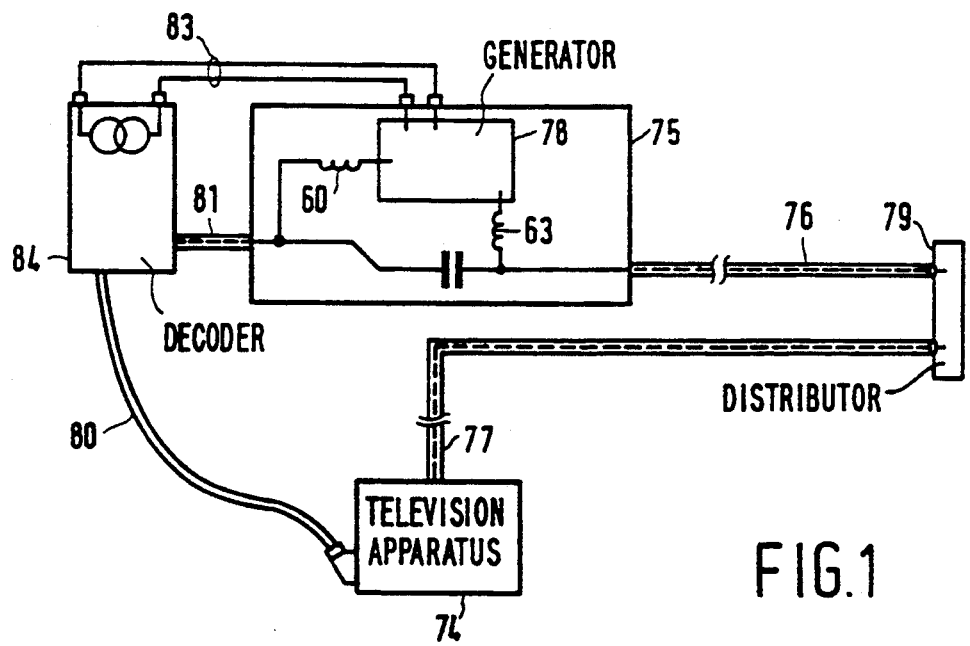
FIG. 1 shows diagrammatically a user installation.

The user installation shown in FIG. 1 comprises:
a television apparatus 74,
a satellite decoder 84 having an input for satellite television signals,
a control and connection unit 75,
and a distributor 79 connected by means of a user cable (not shown) to an output of one of the switching units to be described hereinafter with reference to FIG. 2 (reference numeral 61 or 62). This distributor comprises a known separating filter for separating in accordance with the frequency to be provided to the television apparatus 74 and to the decoder 84 (i.e. the bands 40-820 MHz and 950-1750 MHz, respectively). It also transmits low-frequency DC currents at least to the decoder 84. The signal decoded by the decoder 84 is applied in the baseband to the television apparatus 74 by means of a peripheral television connection 80.

The input of the decoder for satellite television signals is connected to the unit 75 by means of a connection cable 81. This connection may be made by means of a very short cable, as the unit 75 is arranged, for example, behind the decoder 84 or at least in its vicinity. It is even possible to use a connector on the unit 75 and directly plug it into the connector of the decoder 84 (the unit 75 is small and lightweight). The unit 75 itself is connected by means of a cable 76 to the distributor 79. In practice, the control and connection unit is inserted in the cable between the output of the switching unit (61, 62, FIG. 2) and the television signal input of the satellite decoder. The television apparatus is connected to the distributor 79 by means of a cable 77. The cables are connected by means of plugs which, for the purpose of simplifying the Figure, are not shown.

The unit 75 comprises connection means for AC communication (at least in the 950-1750 MHz band) via a series-arranged capacitance between the part of the cable 76 with the connector or the part of the cable 81 connected to the decoder. As a function of the choice made by the user, the majority of commercially available decoders may generate a DC voltage of 14 or 18 V at their input terminal (here 81) for selecting one of two polarizations. Certain commercially available decoders (but not all) may also generate a DC voltage whose values usually range between 0 and 42 mA in a two-wire connection (here 83) for controlling a specific magnetic polarizer ("polarotor") implemented to function with this decoder.

The control and connection unit 75 comprises a control signal generator 78 which applies a control signal from the selection source to the cable 76 via a signal-blocking inductance 63, which control signal is different from that supplied by the decoder. This control signal generator is connected to the input 81 of the satellite decoder via a signal-blocking inductance 60 and also to said two-wire control current connection 83 and determines the value of the control signal voltage to be applied as a function of the value of the voltage supplied by the satellite decoder at its input 81 and as a function of the value of said current generated on the connection 83. As the current value and the user instructions can be programmed in the decoder, the generator 78 need not be programmable: it is the decoder which is programmed for furnishing the current desired for each choice made by the user.

In accordance with a first embodiment the control voltages generated by the generator 78 assume discrete values, for example 0 V, 3 V, 6 V, 9 V, etc., each of which corresponds to a different selection to be made by means of the switching unit. The value of 0 V preferably corresponds to a selection on the part of the switch in order that the latter furnishes a suitable signal because it is associated with an installation which furnishes no control voltage (the installation does not comprise the connection unit according to the invention).

In another embodiment the control voltages generated by the generator 78 assume discrete DC voltage values, for example, 14 V and 18 V, and an AC voltage having, for example an efficient value of 1 V and a frequency of 22 kHz which is either or not superimposed thereon. Thus either 14 V DC or 14 V DC+1 V AC at 22 kHz, or 18 V DC, or 18 V DC+1 V AC at 22 kHz is available, which thus provides four possibilities, each of which corresponds to a different selection to be made by means of the switching unit. This second embodiment can easily be realised because it is sufficient that the generator 78 directly transfers the DC voltage present at the output of the decoder 84, on which it superimposes or on which it does not superimpose an AC voltage, in function of the value of the current applied to generator 78 via the two-wire connection 83. Alternatively, the series capacitor between the cables 81 and 76 could be replaced by a circuit blocking signals in the frequency range of said AC voltage (here 22 kHz), but transferring said DC signal from cable 81 to cable 76. In this case the generator 78 only has to apply yes or no said AC voltage on cable 76.

Figure 2:
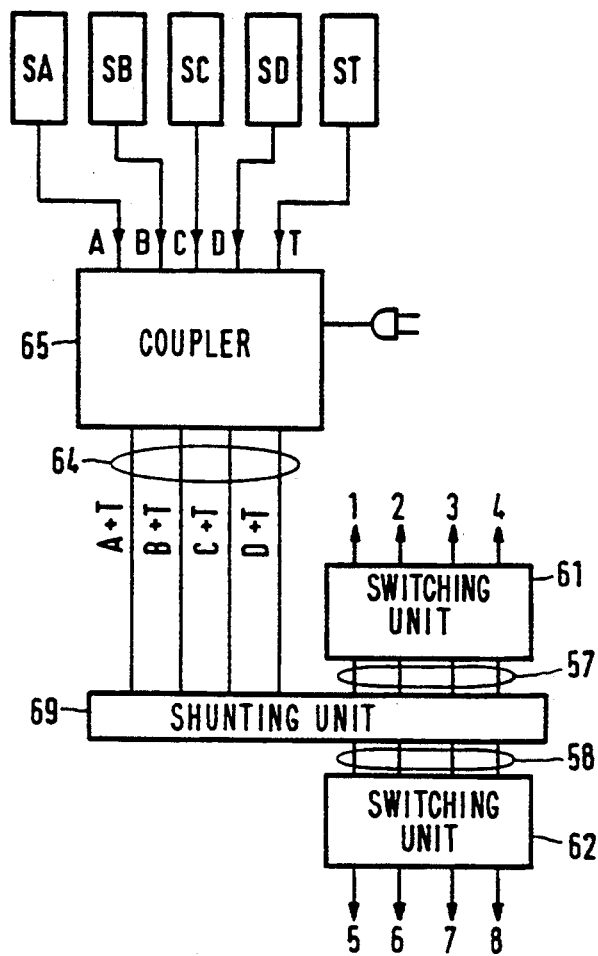
FIG. 2 shows a diagram of a system assembly according to the invention serving 8 users, while the relevant user installations are not shown.

The system for distributing television signals by cable, whose diagram is shown in FIG. 2, serves eight user installations. It comprises several television signal sources SA, SB, SC, SD, ST. The source ST is, for example an aerial or a group of aerials for receiving terrestrial broadcasts associated with one or several amplifiers situated in their vicinity for the purpose of improving the signal-to-noise ratio. The sources SA, SB, SC, SD use parabolas for receiving the satellite broadcasts associated with the corresponding receiving units which are used, inter alia, to decrease the reception frequency so as to convey it in the band of 950 to 1750 MHz mentioned above. In the relevant embodiment there is one source for receiving terrestrial broadcasts, supplying its signals through a cable T, and there are four sources for satellite broadcasts, supplying signals through the cables A, B, C, D. All these sources are situated close together, for example, on the roof of a building.

At the outputs of the signal sources connected at A, B, C, D, T the system is also provided with a coupler 65. At each of its four output connections 64, this coupler supplies the coupled signals from the connections A and T, the coupled signals from the connections B and T, the coupled signals from the connections C and T, the coupled signals from the connections D and T, respectively, which signals may also be amplified. The assembly of signal sources thus constitutes four separate sources 64. This assembly is followed by a distribution network comprising four cables, i.e. as many cables as there are satellite signal sources.

Proximate to the users, the cables of the distribution network are connected to a shunting unit 69 connecting them via connections 57, 58 each constituted by four coaxial conductors to inputs of the two switching units 61, 62 each having four input terminals. Each output terminal of one of these switching units is connected to one of said user installations by means of a cable (reference numerals 1 to 8). The users form a group of eight in this case, divided into two sub-groups of four, and each of the two sub-groups is served by the switching units 61, 62, respectively.

Each switching unit has means (not shown) which can easily be made by those skilled in the art on the basis of programmable (electronic or mechanical) switches for selecting one of its four inputs and for connecting it to one of its four output terminals (1–4 or 5–8) as a function of the value of a control signal, and this for each of the four outputs. This control signal, which is applied to each of the cables 1 to 8, may easily be separated from the relevant television signals because of their very different frequencies.

An assembly of elements for constituting such a system comprises, for example shunting units being provided for connecting four cables and comprising two groups of four outputs, switching units having four inputs and four outputs, switching units having four inputs and eight outputs, switching units having eight inputs and four outputs and switching units having eight inputs and eight outputs. A similar system may also be used in individual houses. In this case there is also an assembly of sources, like the sources SA, SB, ST in FIG. 1, with a coupler which is analogous to the coupler 65 in FIG. 1, possibly without amplification and without a shunting unit, but with a switching unit having four inputs and four outputs so that the individual user can have the disposal of up to four terminals for four separate television installations.

I claim:

1. A connection and control unit for use at a user installation which selectively receives any one of a plurality of satellite television signals transmitted from respective sources via a television signal distribution system, said connection and control unit comprising:
   a. a first connection for coupling said unit to a television signal output of a switching means which is adapted to selectively connect said television signal output to any one of said plurality of satellite television signals in response to a control signal;
   b. a second connection for coupling said unit to a television signal input of a satellite decoder which is adapted to provide at said input DC control voltages representing different selections of said satellite television signals;
   c. a third connection for coupling said unit to a control current output of the satellite decoder which is adapted to provide at said output control currents representing different selections of said satellite television signals;
   d. connection means coupling the first and second connection for enabling propagation of selected satellite television signals from the output of the switching means to the input of the satellite decoder; and
   e. signal generator means coupled to at least the third connection and the first connection for producing said control signal as a function of at least said control currents.

2. A connection and control unit as in claim 1 where the signal generator means is coupled to the first, second and third connection and where the control signal is a function of both the DC control voltages and the control currents.

3. A connection and control unit as in claim 2 including blocking means for blocking propagation of the control signal to the television signal input of the satellite decoder.

4. A connection and control unit as in claim 2 where the control signal comprises selectable DC voltages representing respective ones of the satellite television signals.

5. A connection and control unit as in claim 2 where the control signal comprises selectable forms including discrete DC voltages representing respective ones of the satellite television signals and a combination of discrete DC voltages and AC voltages representing different ones of the satellite television signals.

6. A connection and control unit as in claim 5 where the AC voltages are superimposed on the DC voltages.

* * * * *